No. 608,664. Patented Aug. 9, 1898.
A. N. FREE.
FLOWER POT.
(Application filed Apr. 18, 1898.)
(No Model.)
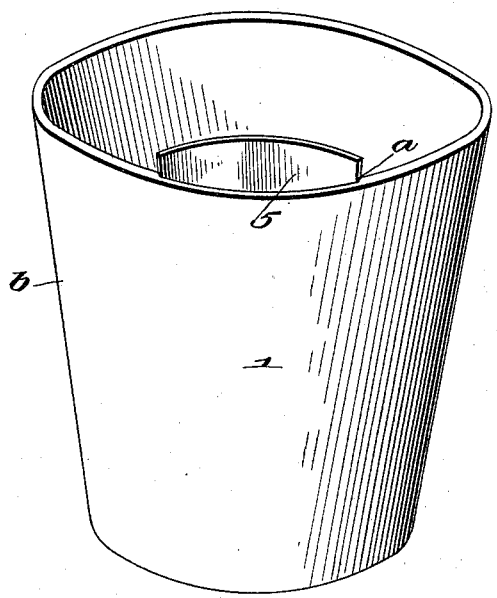
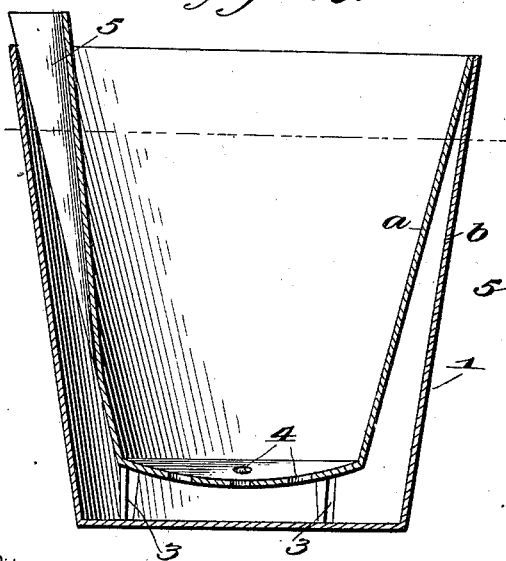
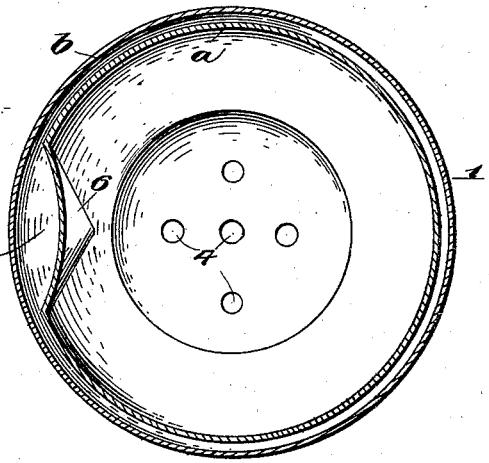
Witnesses
C. E. Hunt
J. A. Willson
Inventor
Allison N. Free,
by H. B. Willson & Co.
Attorneys
THE NORRIS PETERS CO., PHOTO-LITHO., WASHINGTON, D. C.

UNITED STATES PATENT OFFICE.

ALLISON N. FREE, OF MILWAUKEE, WISCONSIN, ASSIGNOR OF ONE-THIRD TO LOUIS R. NINNEMANN, OF SAME PLACE.

FLOWER-POT.

SPECIFICATION forming part of Letters Patent No. 608,664, dated August 9, 1898.

Application filed April 18, 1898. Serial No. 678,019. (No model.)

*To all whom it may concern:*

Be it known that I, ALLISON N. FREE, a citizen of the United States, residing at Milwaukee, in the county of Milwaukee and State of Wisconsin, have invented certain new and useful Improvements in Flower-Pots; and I do declare the following to be a full, clear, and exact description of the invention, such as will enable others skilled in the art to which it appertains to make and use the same.

The invention has relation to flower-pots; and the object is to provide a flower-pot capable of receiving and containing a large supply of water which is adapted to be fed to the soil within the pot, and thus furnish the desired amount of moisture to the growing plant or flower.

With this object in view the invention consists in certain features of construction and combination of parts, which will be hereinafter fully described and claimed.

In the accompanying drawings, Figure 1 is a perspective view of my improved flower-pot. Fig. 2 is a vertical sectional view of the same, and Fig. 3 is a transverse sectional view.

In the drawings, 1 denotes the pot, which consists of the inner and outer shells $a\ b$, both of which taper from top to bottom and the former of which has a greater taper than the latter, as more clearly shown in Fig. 2, thereby providing an annular water-space. When made of metal, these two shells have their upper ends secured by soldering or brazing, and when made of clay the upper ends are molded together.

The inner shell is adapted to contain the soil for the growing plant, and in order that the weight of this soil may not break or tear loose the joint or connection of the upper end of the inner shell I provide the lower end of the shell with supporting-legs 3, which rest on the bottom of the outer shell. The bottom of the inner shell is also provided with an aperture or apertures 4.

5 denotes a feed-spout, which is preferably formed by bulging inwardly the inner shell at the point shown at 6 in Fig. 3 and extending the bulge vertically above the edge of the inner shell, so as to prevent the soil contained within said shell from falling down into the opening formed by this bulge and clogging up the water-space.

The feed-opening, as shown in Fig. 1, is elliptical, so that in pouring water therein there will be a sufficient amount of space at the converging ends of the opening to allow the air to escape from the water-space, it being a well-known fact that when pouring water from a vessel it falls in streams circular in cross-section, thus leaving an unobstructed passage for the escape of air at the ends of the elliptical opening.

Having thus described my invention, what I claim as new, and desire to secure by Letters Patent, is—

A flower-pot consisting of inner and outer tapering shells, the inner shell having a greater taper than the outer shell and having its upper edge connected to the upper edge of the outer shell and provided at its lower end with apertures, and with supporting-feet that rest on the bottom of the outer shell, said inner shell being bulged laterally and having an upward extension that projects beyond the upper edge of the outer shell, thus forming an elliptical feed-opening, substantially as set forth.

In testimony whereof I have hereunto set my hand in presence of two subscribing witnesses.

ALLISON N. FREE.

Witnesses:
JOS. A. SMRZ,
HENRY C. ROETHLISBERGER.